(12) United States Patent
Matsumoto

(10) Patent No.: US 7,076,238 B2
(45) Date of Patent: Jul. 11, 2006

(54) WIRELESS COMMUNICATION SYSTEM EXCHANGING ENCRYPTED DATA

(75) Inventor: Hideto Matsumoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 243 days.

(21) Appl. No.: 10/705,917

(22) Filed: Nov. 13, 2003

(65) Prior Publication Data

US 2004/0157583 A1 Aug. 12, 2004

(30) Foreign Application Priority Data

Nov. 18, 2002 (JP) ............................. 2002-334104

(51) Int. Cl.
*H04M 1/66* (2006.01)
(52) U.S. Cl. ...................... 455/410; 455/411; 380/270
(58) Field of Classification Search ................ 455/410, 455/411, 41.1, 41.2, 63.3, 73, 561, 562.1, 455/557, 560; 713/168, 170, 161, 182; 380/247, 380/255, 270
See application file for complete search history.

(56) References Cited

U.S. PATENT DOCUMENTS

| | | | | |
|---|---|---|---|---|
| 5,901,355 | A * | 5/1999 | Doner .......................... | 455/447 |
| 6,330,333 | B1 * | 12/2001 | Mizikovsky et al. ....... | 380/207 |
| 6,453,159 | B1 * | 9/2002 | Lewis ......................... | 455/411 |
| 6,457,126 | B1 * | 9/2002 | Nakamura et al. .......... | 713/166 |
| 6,542,992 | B1 * | 4/2003 | Peirce et al. ................ | 713/153 |
| 6,842,617 | B1 * | 1/2005 | Williams et al. ............ | 455/444 |
| 2002/0137517 | A1 * | 9/2002 | Williams et al. ............ | 455/444 |
| 2004/0057410 | A1 * | 3/2004 | Kaipiainen et al. ......... | 370/338 |
| 2004/0157583 | A1 * | 8/2004 | Matsumoto ................. | 455/410 |

FOREIGN PATENT DOCUMENTS

| | | |
|---|---|---|
| JP | A 10-224340 | 8/1998 |
| JP | A 2002-124960 | 4/2002 |
| WO | WO 02/33905 A1 | 4/2002 |

* cited by examiner

*Primary Examiner*—Sonny Trinh
(74) *Attorney, Agent, or Firm*—Oliff & Berridge, PLC

(57) ABSTRACT

A wireless communication system includes a terminal device that transmits a wireless signal and an electronic device that receives the wireless signal transmitted by the terminal device. The terminal device is provided with an encrypting system that encrypts data to be transmitted, a first communication system that transmits deciphering data to the electronic device with a wireless signal having a directivity, and a second communication system that transmits the encrypted data to the electronic device with a wireless signal which does not have the directivity. Further, the electronic device is provided with a third communication system that receives the wireless signal transmitted by the transmitting system of the terminal device, and a decoding system that decodes the encrypted data that is received through the third communication system using the deciphering data that is received through the third communication system.

32 Claims, 8 Drawing Sheets

WIRELESS COMMUNICATION SYSTEM EXCHANGING ENCRYPTED DATA

BACKGROUND OF THE INVENTION

The present invention relates to a wireless communication system having a plurality of electronic devices that exchange encrypted data with a wireless transmission.

Conventionally, wireless communication systems typically known as a wireless LAN (Local Area Network) are in widespread use. In the wireless communication system, in order to keep secrecy of data exchanged between the electronic devices, encryption system is generally employed.

In a transmitting station, data is encrypted before transmitted using a predetermined data (which will be referred to as ciphering data) for encryption. In a receiving station which receives the thus encrypted data, the encrypted data is decoded using deciphering data. It should be noted that, when the ciphering data used for encrypting and the deciphering data used for decoding are the same, i.e., the ciphering data used for encrypting can also be used for decoding, the deciphering data is also called as the ciphering data.

As the encryption system, a public key encryption system in which the ciphering data and the deciphering data are different, and a common key encryption system in which the ciphering data and the deciphering data are the same have generally been known. It is also known that the common key encryption system requires less processing load to the communication system than the public key encryption system since the same ciphering/deciphering data is used in the transmitting and receiving stations.

In the encrypting/decoding system that does not require that the deciphering data is transmitted from the receiving station to the transmitting station, there is little chance that the deciphering data is known by other stations. Thus, in such a system, the encrypted data will hardly be decoded by other stations, and the secrecy of the data can be kept.

An example of the communication system employing the public key encrypting system is disclosed in Japanese Patent Application Provisional Publication No. HEI 10-224340. According to the system disclosed in this publication, in order to improve the secrecy of data exchanged between a wireless transmitting station and a wireless receiving station, data such as a pop table is encrypted using public key data (i.e., the ciphering data), and the encrypted data is transmitted to the receiving station. Then, in the receiving station, with use of preliminary set secret key data (i.e., deciphering data), the received data is decoded. In this system, data should be encrypted using the public key data that corresponds to the secret key data, and thus, the public key data has been transmitted from the receiving station to the transmitting station.

In the common key encrypting system, the same key data (i.e., the common key data) is used for encrypting in the transmitting station, and for decoding in the receiving station. If, in such a system, the common key data is transmitted from the receiving station to the transmitting station, it may be received by another station which is not intended by a user. It should be noted that, any station which receives the common key data, can decode the encrypted data using the same common key data, and it is hard to keep the secrecy in such a case.

SUMMARY OF THE INVENTION

The present invention is advantageous in that, in an environment where the deciphering data is to be transmitted/received between the transmitting station and the receiving station, secrecy of the encrypted data exchanged therebetween by a wireless communication can be kept.

According to an aspect of the invention, there is provided a wireless communication system including a terminal device that transmits a wireless signal and an electronic device that receives the wireless signal transmitted by the terminal device. In particular, the terminal device is provided with an encrypting system that encrypts data to be transmitted, a first communication system that transmits deciphering data to the electronic device with a wireless signal having a directivity, and a second communication system that transmits the encrypted data to the electronic device with a wireless signal which does not have the directivity. Further, the electronic device is provided with a third communication system that receives the wireless signal transmitted by the transmitting system of the terminal device, and a decoding system that decodes the encrypted data that is received through the third communication system using the deciphering data that is received through the third communication system.

According to another aspect of the invention, there is provided a wireless communication system including a terminal device that transmits a wireless signal and an electronic device that receives the wireless signal transmitted by the terminal device. In such a communication system, the electronic device may be provided with a first communication system that transmits ciphering data to be used for encrypting data to the terminal device with a wireless signal having a directivity, a second communication system that receives encrypted data to be processed, the second communication system does not have directivity, and a decoding system that decodes the encrypted data received through the second communication system using the deciphering data corresponding to the ciphering data transmitted by the first communication system. Further, the terminal device may be provided with a third communication system that is capable of receiving the ciphering data transmitted by the first communication system and transmitting data to the second communication system, and an encrypting system that encrypts data to be processed using the ciphering data received through the third communication system, the encrypted data being transmitted to the second communication system through the third communication system.

Optionally, in each of the above configurations, the first communication system may be provided with a directional antenna, and the second communication system may be provided with an omnidirectional antenna.

Further optionally, a communication between the first communication system and the third communication system and a communication between the second communication system and the third communication system may be performed in accordance with the same communication protocol.

In a particular case, the ciphering data is identical to the deciphering data. Alternatively, the ciphering data and the deciphering data may be different from each other.

Still optionally, the third communication system may not have the directivity.

Further optionally, the first communication system may be provided with a directional antenna, and the second communication system may be provided with an omnidirectional antenna.

According to another aspect of the invention, there is provided a terminal device for a wireless communication system including the terminal device and an electronic device. The terminal device may be provided with an encrypting system that encrypts data to be transmitted to the electronic device, a first communication system that transmits deciphering data to the electronic device with a wireless signal having a directivity, and a second communication system that transmits the encrypted data to the electronic device with a wireless signal which does not have the directivity, the encrypted data being decodable using the deciphering data transmitted by the first communication system.

Optionally, the first communication system may be provided with a directional antenna, and the second communication system may be provided with an omnidirectional antenna.

Further, the ciphering data may be identical to the deciphering data. Alternatively, they could be different from each other.

According to a further aspect of the invention, there is provided an electronic device for a wireless communication system including a terminal device and the electronic device. Specifically, the electronic device may include a first communication system that transmits ciphering data to be used for encrypting data to the terminal device with a wireless signal having a directivity, a second communication system that receives data to be processed from the terminal device, the second communication system does not have directivity, the data transmitted from the terminal device being encrypted using the ciphering data transmitted by the first communication system, and a decoding system that decodes the encrypted data received through the second communication system using the deciphering data corresponding to the ciphering data transmitted by the first communication system.

Optionally, the first communication system may be provided with a directional antenna, and the second communication system may be provided with an omnidirectional antenna.

Further, the ciphering data may be identical to the deciphering data. Alternatively, they could be different from each other.

According to a furthermore aspect of the invention, there is provided device implemented with a program that enables the device to function as a terminal device for a wireless communication system including the terminal device and an electronic device. The terminal device realized by the program may include an encrypting system that encrypts data to be transmitted to the electronic device, a first communication system that transmits deciphering data to the electronic device with a wireless signal having a directivity, and a second communication system that transmits the encrypted data to the electronic device with a wireless signal which does not have the directivity, the encrypted data being decodable using the deciphering data transmitted by the first communication system.

According to another aspect of the invention, there is provided a device implemented with a program that enables the device to function as an electronic device for a wireless communication system including a terminal device and the electronic device. The electronic device realized by the program may include a first communication system that transmits ciphering data to be used for encrypting data to the terminal device with a wireless signal having a directivity, a second communication system that receives data to be processed from the terminal device, the second communication system does not have directivity, the data transmitted from the terminal device being encrypted using the ciphering data transmitted by the first communication system, and a decoding system that decodes the encrypted data received through the second communication system using the deciphering data corresponding to the ciphering data transmitted by the first communication system.

It should be noted that the systems and devices according to the present invention can be realized when appropriate programs provided and executed by a personal computer or the like. Such programs may be stored in recording medium such as a flexible disk, CD-ROM, memory cards and the like and distributed. Alternatively or optionally, such programs can be distributed through networks such as the Internet.

BRIEF DESCRIPTION OF THE ACCOMPANYING DRAWINGS

FIG. 1 is a block diagram of a printer and a personal computer of a wireless communication system according to a first embodiment of the invention;

FIG. 2 schematically shows an appearance of the printer shown in FIG. 1;

FIG. 3 schematically shows an appearance of the personal computer shown in FIG. 1;

Figure 6:
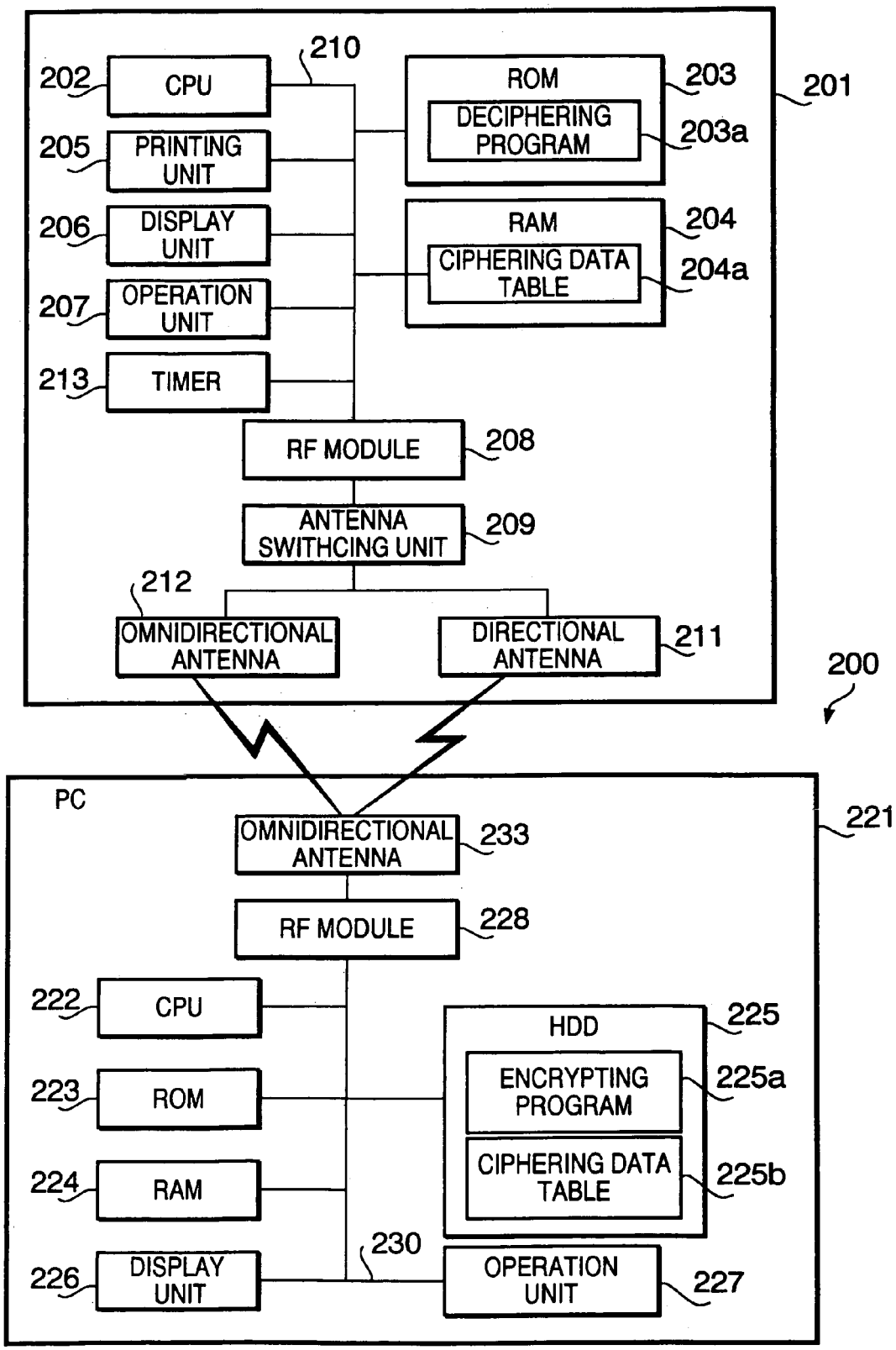
FIG. 6 is a block diagram of a printer and a personal computer of a wireless communication system according to a second embodiment of the invention.
Figure 7:
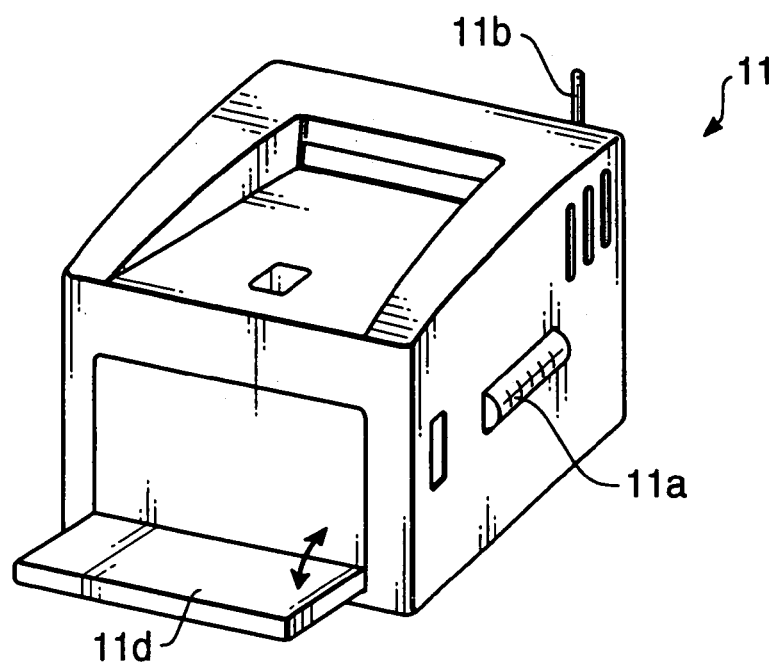
Figure 8:
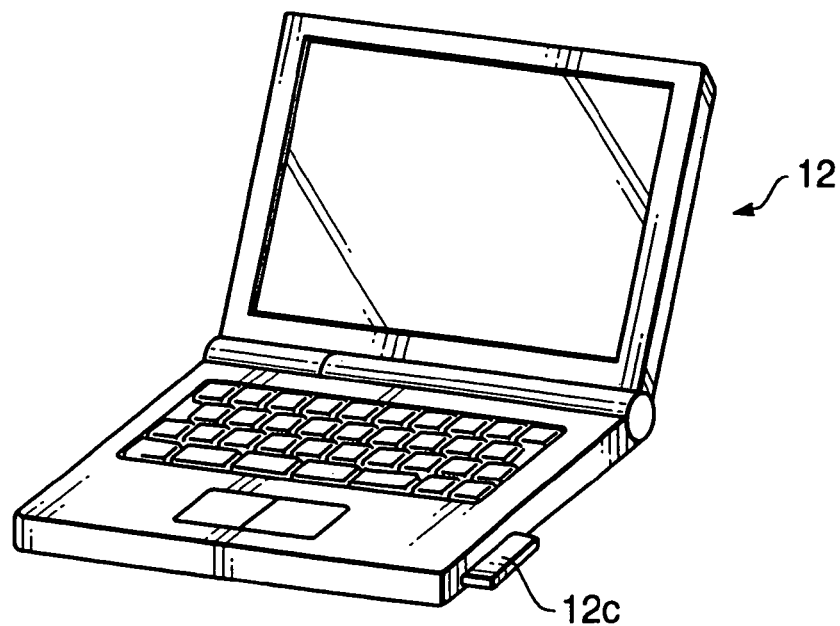
Figure 9:
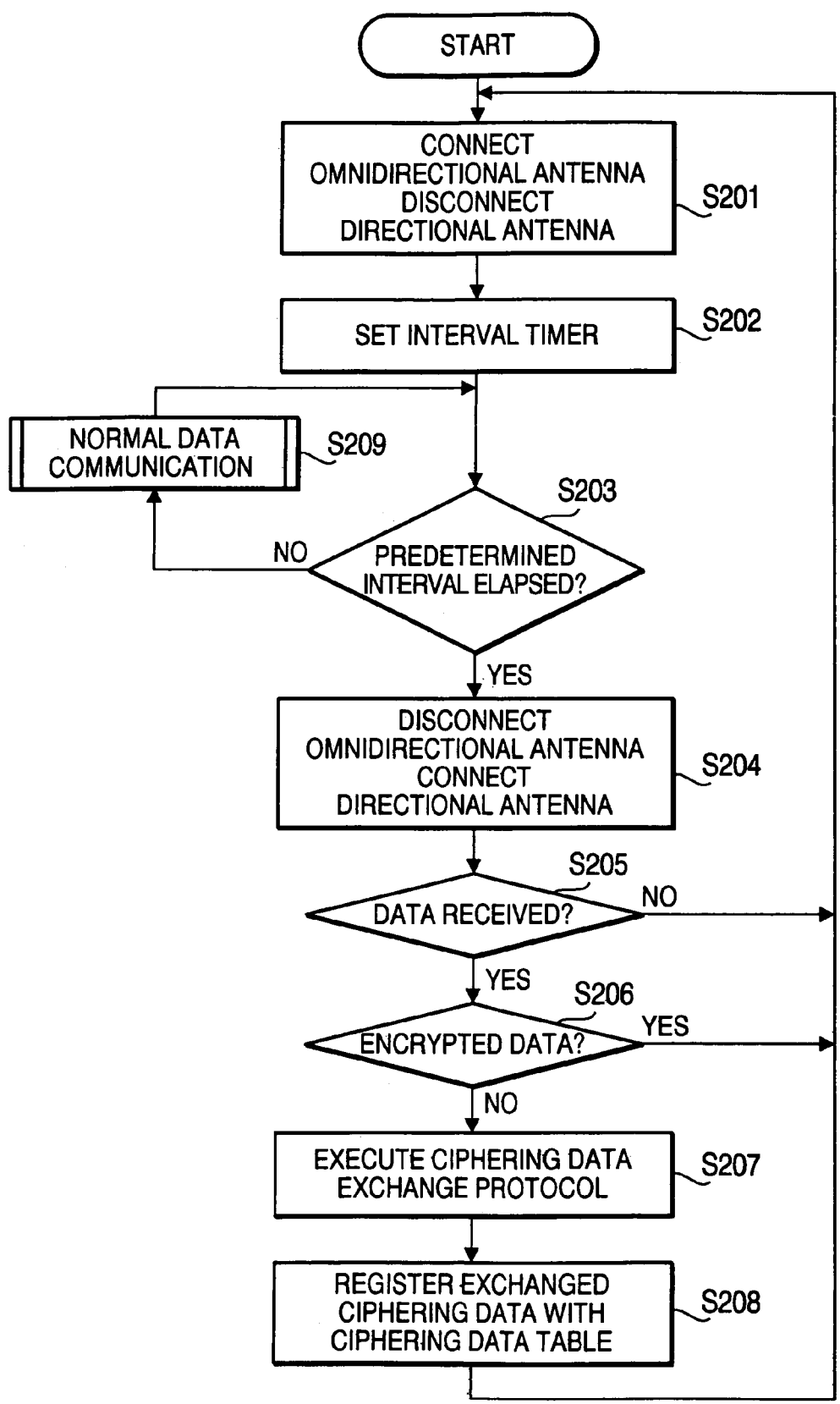
Figure 10:
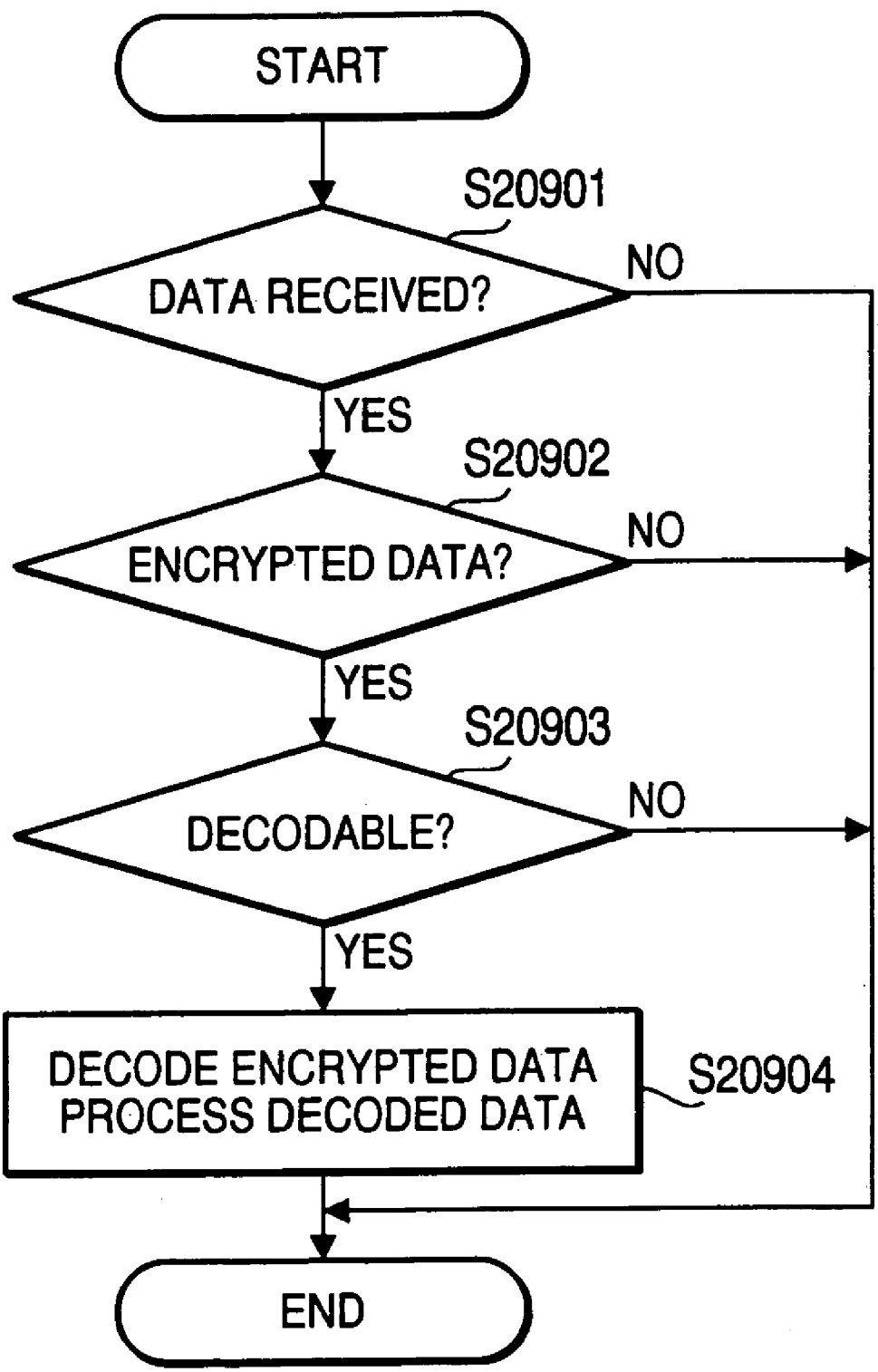

FIG. 7 schematically shows an appearance of the printer shown in FIG. 6;

FIG. 8 schematically shows an appearance of the personal computer shown in FIG. 6;

FIG. 9 is a flowchart illustrating a transmission procedure executed by a CPU of the printer; and FIG. 10 is a flowchart illustrating a normal data communication executed in the transmission procedure shown in FIG. 9.

DETAILED DESCRIPTION OF THE EMBODIMENTS

Hereinafter, referring to the accompanying drawings, wireless communication systems according to embodiments of the invention will be described.

First Embodiment

Figure 1:
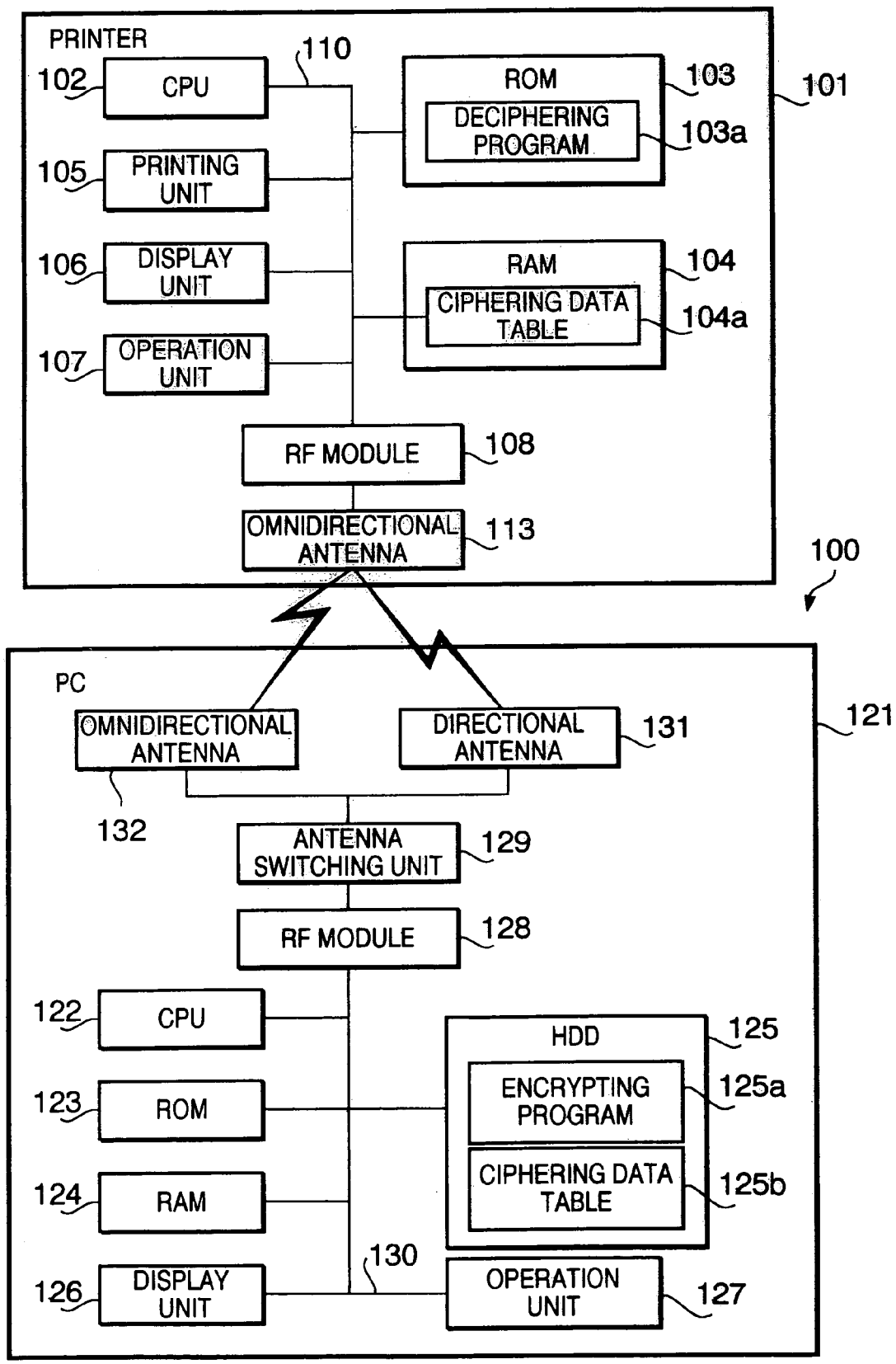

FIG. 1 is a block diagram of a printer 101 and a personal computer (PC) 121 of a wireless communication system 100 according to a first embodiment of the invention. In the embodiment, the printer 101 serves as an example of an electronic device, and the personal computer 121 serves as an example of a terminal device. In FIG. 1, for the brevity, only one printer 101 and one personal computer 121 are shown. It should be noted that the communication system 100 could be configured to have a plurality of printers, personal computers, and other electronic devices and terminal devices.

As shown in FIG. 1, the printer 101 has a CPU (Central Processing Unit) 102, a ROM (Read Only Memory) 103, a RAM (Random Access Memory) 104, a printing unit 105, a display unit 106, an operation unit 107, an RF (Radio Frequency) module 108 and an omnidirectional antenna 113.

The CPU 102, the ROM 103, the RAM 104, the printing unit 105, the display unit 106, the operation unit 107 and the RF module 108 are interconnected through a system bus 110. The omnidirectional antenna 113 is connected to the RF module 108.

The CPU 102 controls the entire operation of the printer 101. In particular, the CPU 102 controls the printing unit 105 to provide the printer function. The CPU 102 also analyzes data received and executes a deciphering program 103a (described later) to decode encrypted data.

The ROM 103 is a read only memory and serves as a part of a main memory space to be used by the CPU 102. The ROM 103 stores the deciphering program 103a. The deciphering program 103a is for decoding the encrypted data using deciphering data stored in a deciphering data table 104a which is stored in the RAM 104.

The RAM 104 is a readable/writable memory, which also serves as a part of the main memory space used by the CPU 102. As mentioned above, the RAM 104 stores the deciphering data table 104a. The deciphering data table 104a stores the deciphering data (in the present embodiment, the common key encrypting system is employed, and accordingly, the deciphering data is identical to the ciphering data which is used either for the ciphering and deciphering). It should be noted that the ciphering data (deciphering data) transmitted to the PC 121 is stored (added) to the deciphering data table 104a in relationship with the PC 121 which transmitted the data. It should be noted that data processing speed when the common key encrypting system is employed is faster than a case where the public key system is employed.

The printing unit 105 provides a printing function for printing monochromatic or color characters/images. The printing unit 105 is connected to the system bus 110 through an I/O (input/output) interface (not shown). The printing unit 105 is used, under control of the CPU 102, for printing out the print data transmitted, for example, from the PC 121.

The display unit 106 is for displaying various information using a display device. The display unit 106 is connected to the system bus 110 through an I/O interface (not shown). The display unit 106 is used, under control of the CPU 102, for displaying information related to functions of the printer 101. The display unit 106 typically includes an LCD (Liquid Crystal Display) panel.

The operation unit 107 is an input device provided to the printer 101 for allowing a user to input various commands/data. The operation unit 107 is also connected to the system bus 110 through an I/O interface (not shown). The operation unit 107 includes a power switch and function buttons related to available functions thereof. The operation unit 107 typically includes a key array provided with a plurality of operation keys.

The RF module 108 is a module used for the wireless communication. Typically, the RF module 108 is a digital circuit including a transmitter and a receiver. The RF module 108 is connected to the system bus 110 through a not shown I/O interface. The RF module 108 is connected with the omnidirectional antenna 113.

The omnidirectional antenna 113 transmits a radio wave in non-specified direction (i.e., the omnidirectional antenna 113 is not designed for a directional wireless communication). As described above, the omnidirectional antenna 113 is connected with the RF module 108. As examples of the omnidirectional antenna 113, a diversity antenna and a whip antenna are well known.

As shown in FIG. 1, the PC 121 includes a CPU 122, a ROM 123, a RAM 124, an HDD (Hard Disk Driver) 125, a display unit 126, an operation unit 127, an RF module 128, an antenna switching unit 129, a directional antenna 131 and an omnidirectional antenna 132. The CPU 122, the ROM 123, the RAM 124, the HDD 125, the display unit 126, the operation unit 127, the RF module 128 are interconnected through a system bus 130. The directional antenna 131 and the omnidirectional antenna 132 are connected to the RF module 128 through the antenna switching unit 129.

The CPU 122 controls entire operation of the PC 121. The CPU 122 selectively retrieves programs (e.g., an encrypting program for encrypting data to be transmitted, and a program for transmitting the encrypted print data to an electronic device) from the HDD 125.

The ROM 123 is a read only memory, and serves as a part of the main memory space for the CPU 122. A boot program for starting up an operating system of the PC 121 is also stored in the ROM 123. The RAM 124 is a readable/writable memory, and serves as a part of the main memory space for the CPU 122.

The HDD 125 includes a readable/writable medium (i.e., a hard disk) and a device for reading/writing data on the hard disk. In the HDD 125, an encrypting program 125a, a ciphering data table 125b, a program for transmitting the encrypted data, and the data to be transmitted to the printer 101 are stored.

The encrypting program 125a encrypts data using the ciphering data stored in the ciphering data table 125b. It should be noted that the ciphering data is generated every time when a cipher code exchanging protocol is executed and is stored/added in the ciphering data table 125b.

The display unit 126 is for displaying various information on a display device. The display unit 126 is connected to the system bus 130 through a not shown I/O interface. The display unit 126 is used, under control of the CPU 122, for displaying various information related to functions of the PC 121. The display unit 126 typically includes an LCD panel.

The operation unit 127 is an input device provided to the PC 121 for allowing the user to input various commands/data. The operation unit 127 is also connected to the system bus 130 through a not shown I/O interface. The operation unit 127 typically includes a mouse and a keyboard provided with a plurality of keys.

The RF module 128 is a module used for the wireless communication. Typically, the RF module 128 is a digital circuit including a transmitter and a receiver. The RF module 128 is connected to the system bus 130 through a not shown I/O interface. The RF module 128 is connected with the directional antenna 131 and the omnidirectional antenna 132 through the antenna switching unit 129.

It is preferable that the directional antenna 131 and the omnidirectional antenna 132 are for the same frequency band, and use a common circuit (i.e., the RF module 108).

The antenna switching unit 129 is for switching the antenna to be connected to the RF module 128. That is, the antenna switching unit 129 is connected with the directional antenna 131 and the omnidirectional antenna 132, one of which is selectively connected to the RF module 128.

The directional antenna 131 is capable of transmitting/receiving radio wave to/from a specific direction (i.e., the directional antenna 131 is designed to perform a directional wireless communication). As examples of the directional antenna, a Yagi antenna and a parabolic antenna have been well known.

The omnidirectional antenna 132 transmits a radio wave in non-specified direction (i.e., the omnidirectional antenna 132 is not designed for a directional wireless communication). As examples of the omnidirectional antenna 132, a diversity antenna and a whip antenna are well known.

Next, an electronic device 1 (e.g., the printer 101) and a terminal device 2 (e.g., the PC 121) according to the first embodiment will be described in detail.

Figure 2:
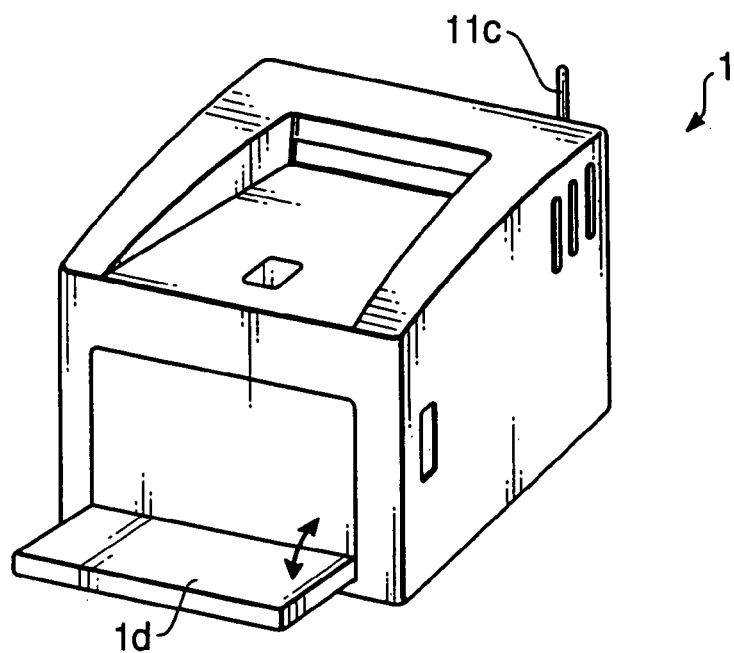
Figure 3:
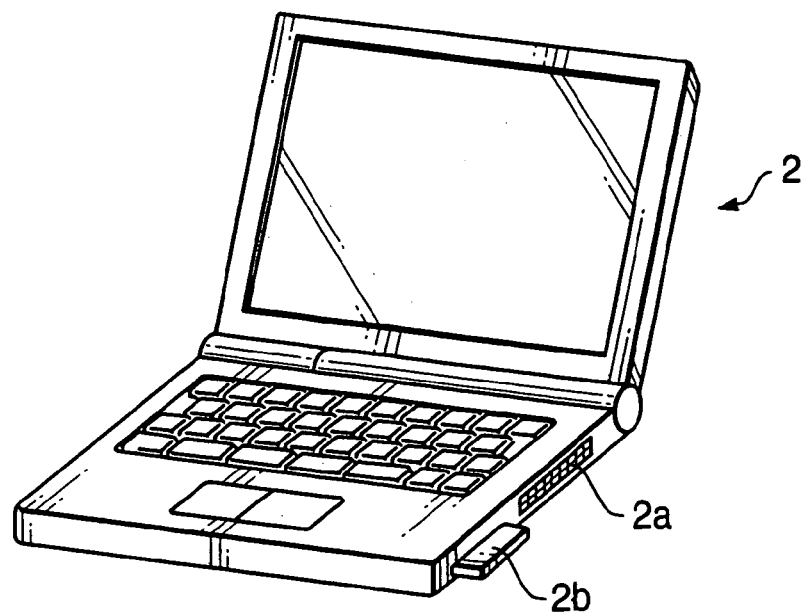

FIG. 2 schematically shows an appearance of the electronic device 1 (e.g., the printer), and FIG. 3 schematically shows an appearance of the terminal device 2 (e.g., the PC). It should be noted that, the electronic device 1 needs not be limited to the printer 101, and other apparatus or equipment, which stores, prints and/or transmits image data and/or document data having secrecy, such as a multifunction peripheral having functions of a facsimile device and the printer, a facsimile machine, a scanner, a device having functions of a file server or a file storage, a stream server, a wireless LAN access point, a Bluetooth access point, may be used as the electronic device 1.

The electronic device 1 is provided with an omnidirectional antenna 11c (e.g., the omnidirectional antenna 113 shown in FIG. 1) and a table 1d. As the omnidirectional antenna 11c, a diversity antenna or a whip antenna can be used. The omnidirectional antenna 11c may be formed integrally with a body of the electronic device 11c or a card type one such as a wireless LAN card having a built-in antenna. The table 1d is provided to the body of the electronic device 1 so as to be opened/closed with respect to the body. When the table 1d is opened as show in FIG. 2, the terminal device 2 can be placed thereon. Preferably, when the terminal device 2 is placed on the table 1d, a receiving direction of the omnidirectional antenna 11c and a transmission direction of a directional antenna 2a meet each other. It should be noted that the table 1d needs not be provided to the electronic device 1.

The terminal device 2 needs not be limited to the PC 121, and any other apparatus that makes use of other electronic device for obtaining, storing, printing and/or transmitting image data and/or document data having secrecy, such as a PDA (Personal Digital Assistant), a cellular phone, a portable game machine, a wireless digital camera, and a wireless video camera can be used as the terminal device 2. The terminal device 2 includes a directional antenna 2a and an omnidirectional antenna 2b. As the directional antenna 2a, the Yagi antenna and the parabolic antenna can be used. As the omnidirectional antenna 2b, the diversity antenna and the whip antenna can be used. It should be noted that the directional antenna 2a may be one, as shown in FIG. 3, integrally formed on the body of the terminal device, or a card type device having a built-in antenna. Similarly, the omnidirectional antenna 2b may be a card type device having the built-in antenna as shown in FIG. 3 or one integrally formed to the body of the terminal device 2.

Next, a procedure, executed in the terminal device 2, for transmitting the encrypted data to the electronic device 1 will be described with reference to FIGS. 4 and 5.

Figure 4:
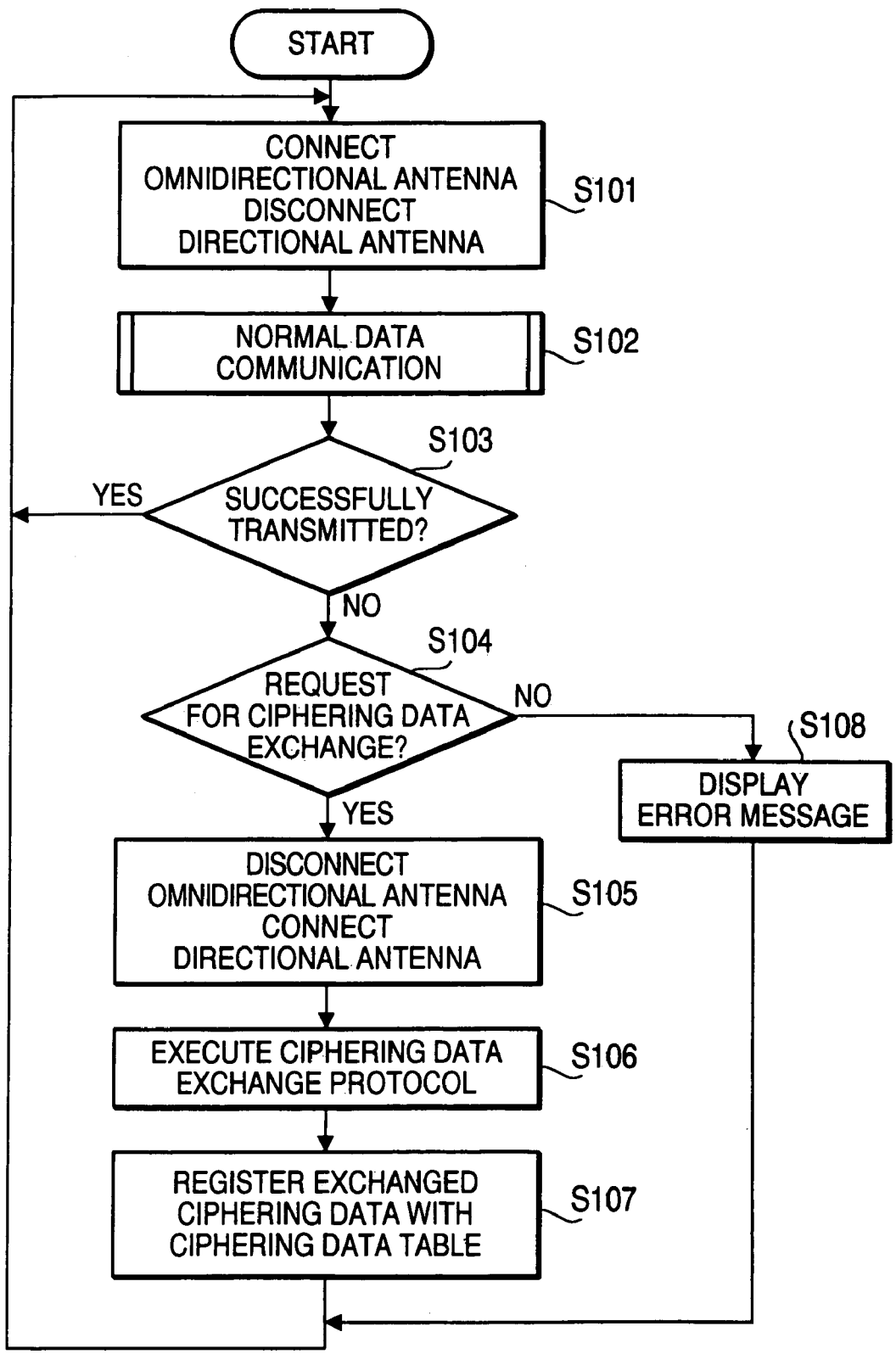
FIG. 4 is a flowchart illustrating a transmission procedure executed by a CPU of the personal computer.
Figure 5:
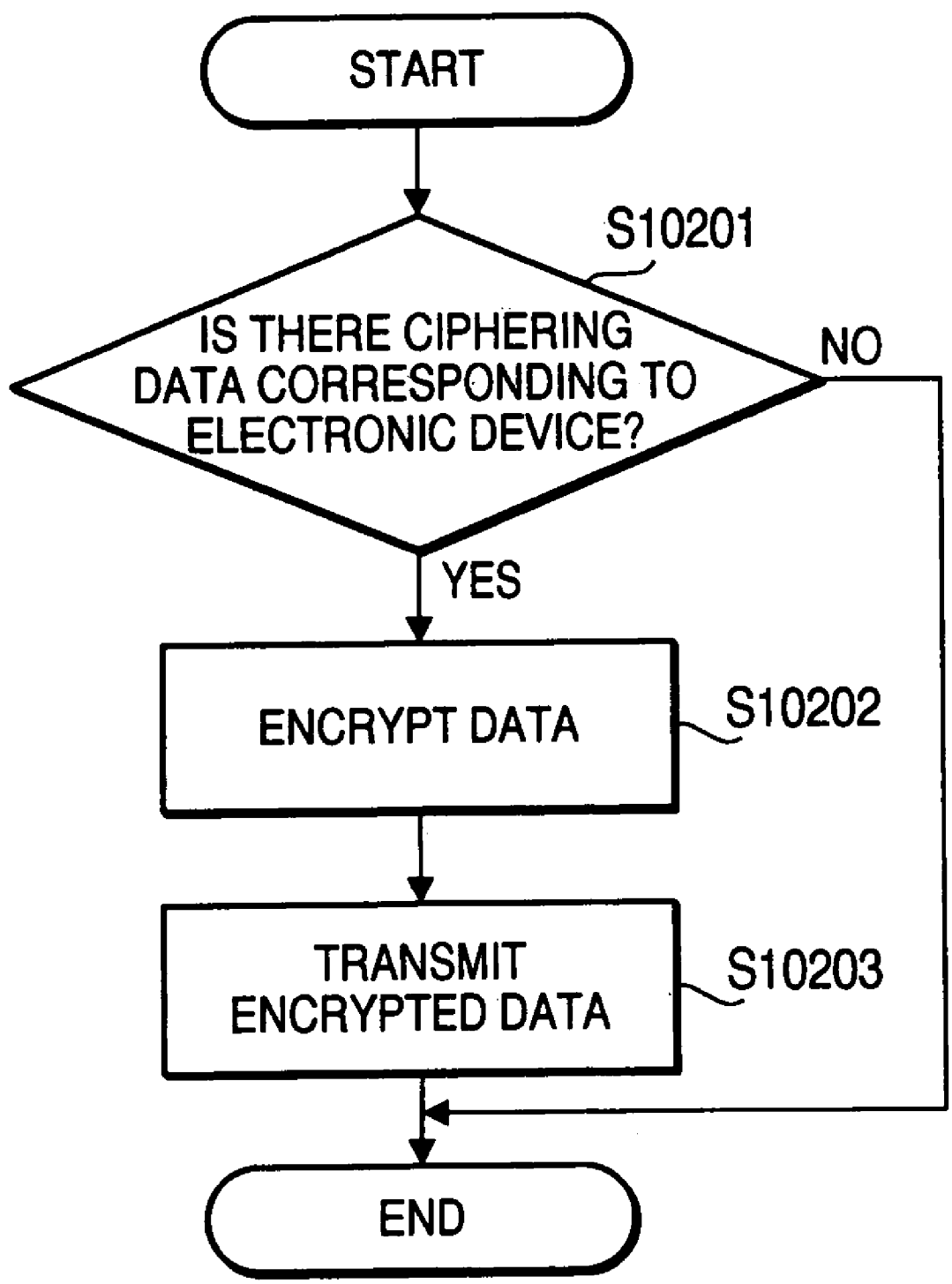
FIG. 5 is a flowchart illustrating a normal data communication executed in the transmission procedure shown in FIG. 4.

FIG. 4 is a flowchart illustrating a transmission procedure executed by a CPU of the PC 121, and FIG. 5 is a flowchart illustrating a normal data communication called in the transmission procedure shown in FIG. 4.

As shown in FIG. 4, the CPU 122 of the PC 121 (i.e., the terminal device) controls the antenna switching unit 129 to connect the omnidirectional antenna 132 to the RF module 128, and disconnect the directional antenna 131 from the RF module 128 (S101).

Then, the PC 121 executes a normal data communication (S102), which will be described later, with respect to the printer 101 (i.e., the electronic device). In S103, the CPU 122 determines whether the data transmission is successfully finished. It should be noted that whether the data transmission has been successfully done is determined taking the execution of the ciphering data exchange protocol into account. That is, when the ciphering data exchange protocol has been executed, the transmission of the data is determined to be successful. However, if the ciphering data exchange protocol has not been executed, the data transmission is determined to be failed.

When the data transmission is determined to be finished successfully (S103: YES), control returns to S101. When the data transmission is determined to be failed (S103: NO), it is further determined whether a ciphering data exchange request has been transmitted from the printer 101 (S104).

When the printer 101 has not issued the ciphering data exchange request (S104: NO), an error message indicating that the connection with the printer 101 cannot be established is displayed (S108), and control returns to S101.

When it is determined that the printer 101 has issued the ciphering data exchange request (S104: YES), the CPU 122 controls the antenna switching unit 129 to connect the omnidirectional antenna 132 to the RF module 128, and disconnect the directional antenna 131 from the RF module (S105).

Next, between the omnidirectional antenna 113 of the printer 101 and the directional antenna 131 of the PC 121, the exchanging protocol of the ciphering data of the common key encrypting system (note that the ciphering data is identical to the deciphering data) is executed (S106).

Then, the ciphering data, which was generated as the exchanging protocol was executed and transmitted to the printer 101, is registered with the ciphering data table 125b stored in the HDD 125 in relationship with the printer 101 in S107. In the printer 101, the ciphering data received from the PC 121 is registered with the deciphering data table 104a in relationship with the PC 121.

With the above procedure, the exchange of the ciphering data is finished. Thereafter, the CPU 122 controls the antenna switching unit 129 to connect the omnidirectional antenna 132 with the RF module 128 and disconnect the directional antenna 131 from the RF module 128 (S108). Then, control returns to S101.

Next, the normal data communication, which is called in S102 of FIG. 4, will be described with reference to FIG. 5.

Firstly, the CPU 122 determines whether the ciphering data corresponding to the printer 101 is stored in the ciphering data table 125b (S10201). When the ciphering data corresponding to the printer 101 is not stored in the ciphering data table 125b (S10201: NO), the normal data communication is terminated. When the ciphering data corresponding to the printer 101 is stored in the ciphering data table 125b (S10201: YES), the CPU 122 encrypts the data to be transmitted using the encrypting program 125a, referring to the ciphering data corresponding to the printer 101, which has been registered with the ciphering data table 125b (S10202). Thus, the data is transmitted to the printer 101 (S10203).

In the printer 101, when the data encrypted using the ciphering data is received from the PC 121, the received encrypted data is decoded using the deciphering program 103a with reference to the ciphering data which was exchanged in S106 and registered with the ciphering data table 104a.

It should be noted that the communication between the omnidirectional antenna 113 and the directional antenna 131, and the communication between the omnidirectional antenna 113 and the omnidirectional antenna 132 are executed using the same communication protocol. When the same communication protocol is used, only communication paths are different, and the wireless signal processing operations are identical. Therefore, the processing of the wireless signals becomes identical, which is convenient and will not increase load to the system.

As above, with the communication system 100 according to the first embodiment, the ciphering data to be referred to for deciphering, which is stored in the ciphering data table 125b of the PC 121, is transmitted through the directional antenna 131 (S105-S106).

As a result, the printer 101 which can receive the ciphering data is limited, and a possibility of tapping of the ciphering data is lowered, and accordingly, the secrecy of the transmitted data can be kept.

Further, according to the first embodiment, the encrypted data using the ciphering data is transmitted from the PC 121 using the omnidirectional antenna 132 (S101 and S102). As a result, the direction of the encrypted data transmitted from the PC 121 needs not be precisely adjusted to meet the printer 101, which is convenient and reduces communication errors.

As described above, a directional mode transmission of the wireless signal can be realized using a generally used directional antenna 131 (e.g., the Yagi antenna), and the omnidirectional mode transmission of the wireless signal is realized using the generally used omnidirectional antenna 132 (e.g., the diversity antenna).

According to the communication system described above, only by configuring the PC 121 to perform the directional mode transmission of the wireless signal and the omnidirectional mode transmission of the wireless signal, the secrecy is improved. No extra structures for improving the secrecy need not be provided to the PC 121 or the printer 101. Thus, the secrecy of the entire system can be improved relatively simply.

Second Embodiment

Next, a communication system according to a second embodiment will be described with reference to FIG. 6.

FIG. 6 is a block diagram of a printer 201 and a personal computer (PC) 221 of a wireless communication system 200 according to the second embodiment of the invention. In the second embodiment, the printer 201 serves as an example of an electronic device, and the PC 221 serves as an example of a terminal device. In FIG. 6, for the brevity, only one printer 201 and one PC 221 of the communication system 200 are shown. It should be noted that the communication system 200 could be configured to have a plurality of printers, personal computers, and other electronic devices and/or terminal devices.

As shown in FIG. 6, the printer 201 has a CPU 202, a ROM 203, a RAM 204, a printing unit 205, a display unit 206, an operation unit 207, an RF module 208, an antenna switching unit 209, a directional antenna 211, an omnidirectional antenna 212 and a timer 213. The CPU 202, the ROM 203, the RAM 204, the printing unit 205, the display unit 206, the operation unit 207, the RF module 208 and the timer 213 are interconnected through a system bus 210. The directional antenna 211 and the omnidirectional antenna 212 are connected to the RF module 208 through the antenna switching unit 209.

The CPU 202 controls the entire operation of the printer 201. In particular, the CPU 202 controls the printing unit 205 to provide the printer function. The CPU 202 also analyzes data received and executes a deciphering program 203a (described later) to decode encrypted data. The CPU 202 further retrieves program for receiving the encrypted data from the terminal device (i.e., PC 221).

The ROM 203 is a read only memory and serves as a part of a main memory space to be used by the CPU 202. The ROM 203 stores the deciphering program 203a, and another program for receiving the encrypted data from the terminal device (e.g., the PC 221). The deciphering program 203a is for decoding the encrypted data using deciphering data registered in a deciphering data table 204a stored in the RAM 204.

The RAM 204 is a readable/writable memory, which also serves as a part of the main memory space used by the CPU 202. The RAM 204 stores the deciphering data table 204a. The deciphering data table 204a stores deciphering data (in the present embodiment, the common key encrypting system is employed, and accordingly, the deciphering data is identical to the ciphering data which is used either the ciphering and deciphering). It should be noted that the ciphering data (deciphering data) is stored (added) to the deciphering data table 204a in relationship with the PC 221 as the ciphering data exchanging protocol is executed.

The printing unit 205, the display unit 206 and the operation unit 207 are the same as the printing unit 105, the display unit 106 and the operation unit 107, respectively, and accordingly the description thereof will not be repeated.

The RF module 208 is a module used for the wireless communication. Typically, the RF module 208 is a digital circuit including a transmitter and a receiver. The RF module 208 is connected to the system bus 210 through a not shown I/O interface. The RF module 208 is connected with the directional antenna 211 and the omnidirectional antenna 212 through the antenna switching unit 209.

It is preferable that the directional antenna 211 and the omnidirectional antenna 212 are configured to transmit/receive the radio wave of the same frequency band, and to use the common circuit (i.e., RF module 208).

The antenna switching unit 209 is for switching the antenna to be connected with the RF module 208, and is connected with the directional antenna 211 and the omnidirectional antenna 212. The antenna switching unit 209 switches the antenna connected with the RF module 208 between the directional antenna 211 and the omnidirectional antenna 212 based on the program for receiving the encrypted data from the terminal device, under control of the CPU 202.

The directional antenna 211 is capable of transmitting/receiving radio wave to/from a specific direction (i.e., the directional antenna 211 is designed to perform a directional wireless communication). As examples of the directional antenna, the Yagi antenna and the parabolic antenna have been well known.

The omnidirectional antenna 212 transmits a radio wave in non-specified direction (i.e., the omnidirectional antenna 212 is not designed for a directional wireless communication). As described above, the omnidirectional antenna 212 is connected with the RF module 208. As examples of the omnidirectional antenna 212, the diversity antenna and the whip antenna are well known.

The timer 213 has a function of measuring time, and is connected to the system bus 210 through a not shown I/O interface. Using the timer 213, the CPU 202 controls the antenna switching unit 209 to switch the antenna to be connected with the RF module 208 between the directional antenna 211 and the omnidirectional antenna 212.

As shown in FIG. 6, the PC 221 includes a CPU 222, a ROM 223, a RAM 224, an HDD (Hard Disk Driver) 225, a display unit 226, an operation unit 227, an RF module 228 and an omnidirectional antenna 233. The CPU 222, the ROM 223, the RAM 224, the HDD 225, the display unit 226, the operation unit 227, the RF module 228 are interconnected through a system bus 230. The omnidirectional antenna 232 is connected to the RF module 228.

The CPU 222 controls the entire operation of the PC 221. The CPU 222 is selectively retrieves programs (e.g., an encrypting program 225a) from the HDD 225, for encrypting the data to be transmitted, and transmits the encrypted data to an electronic device (e.g., the printer 201) as print data.

The ROM 223 and the RAM 224 are similar to the ROM 123 and the RAM 124 of the first embodiment, respectively, and the description thereof will be omitted.

The RF module 228 is a module used for the wireless communication. Typically, the RF module 228 is a digital circuit including a transmitter and a receiver. The RF module 128 is connected to the system bus 130 through a not shown I/O interface. The RF module 128 is connected with the directional antenna 131 and the omnidirectional antenna 132 through the antenna switching unit 129.

The HDD 225 includes a readable/writable medium (i.e., a hard disk) and a device for reading/writing data from/on the hard disk. In the HDD 225, the encrypting program 225a, a ciphering data table 225b, and the data to be transmitted to the printer 201 are stored.

The encrypting program 225a encrypts data using the ciphering data stored in the ciphering data table 225b. It should be noted that the ciphering data table 225b is for storing the ciphering data, which is transmitted from the printer 201. According to the embodiment, the common key encrypting system is employed, and therefore the same key is used for encrypting and decoding. That is, the ciphering data is identical to the deciphering data.

The RF module 228 is used for executing the wireless communication. The RF module 228 is a digital circuit including a transmitting device and a receiving device. The RF module 228 is connected with the system bus 230 through an I/O interface (not shown). The RF module 228 is connected to the omnidirectional antenna 233.

The omnidirectional antenna 233 transmits a radio wave in non-specified direction (i.e., the omnidirectional antenna 233 is not designed for a directional wireless communication). As examples of the omnidirectional antenna 233, a diversity antenna and a whip antenna are well known.

Next, an electronic device 11 (e.g., the printer 201) and a terminal device 12 (e.g., the PC 221) according to the second embodiment will be described in detail.

FIG. 7 schematically shows an appearance of the electronic device 11 (e.g., the printer 201 of FIG. 6), and FIG. 8 schematically shows an appearance of the terminal device 12 (e.g., the PC 221 of FIG. 6). It should be noted that, the electronic device 11 needs not be limited to the printer 201, and any other apparatus and equipment, which stores, prints and/or transmits image data and/or document data having secrecy, such as a multifunction peripheral having functions of a facsimile device and the printer, a facsimile machine, a scanner, a device having functions of a file server or a file storage, a stream server, a wireless LAN access point, a Bluetooth access point, may be used as the electronic device 11.

The electronic device 11 is provided with a directional antenna 11a (e.g., the directional antenna 211 of FIG. 6) and an omnidirectional antenna 11b (e.g., the omnidirectional antenna 212 shown in FIG. 6). As the directional antenna 11a, the Yagi antenna or the parabolic antenna can be used.

As the omnidirectional antenna 11b, a diversity antenna or a whip antenna can be used. The directional antenna 11a may be formed integrally with the body of the electronic device 11. Alternatively, the directional antenna may be of a card having a built-in antenna. Similarly, the omnidirectional antenna 11b may be formed integrally with the body of the electronic device 11 or a card type device having a built-in antenna.

A table 11d is provided to the body of the electronic device 11 so as to be opened/closed. When the table 11d is opened as show in FIG. 7, the terminal device 12 can be placed thereon. Preferably, when the terminal device 12 is placed on the table 11d, a transmission direction of the directional antenna 11a and a receiving direction of an omnidirectional antenna 12c (e.g., the omnidirectional antenna 233) meet each other. It should be noted that the table 11d needs not be provided to the electronic device 11.

The terminal device 12 needs not be limited to the PC 221, and any other apparatus, that makes use of other electronic device for obtaining, storing, printing and/or transmitting image data and/or document data having secrecy, such as a PDA (Personal Digital Assistant), a cellular phone, a portable game machine, a wireless digital camera, and a wireless video camera can be used as the terminal device 12. The terminal device 12 is provided with an omnidirectional antenna 12c. As the omnidirectional antenna 12c, the diversity antenna and the whip antenna can be used. It should be noted that the omnidirectional antenna 12c may be a card type device having the built-in antenna as shown in FIG. 8 or one integrally formed to the body of the terminal device 12.

Next, a procedure, executed in the electronic device 11, for receiving the encrypted data from the terminal device 12 will be described with reference to FIGS. 9 and 10.

FIG. 9 is a flowchart illustrating a receiving procedure executed by a CPU of the printer 201, and FIG. 10 is a flowchart illustrating a normal data communication called in the receiving procedure shown in FIG. 9.

As shown in FIG. 9, the CPU 202 of the printer 201 (i.e., the electronic device) controls the antenna switching unit 209 to turn ON the omnidirectional antenna 212, and turn OFF the directional antenna 211 (S201).

In S202, the CPU 202 controls the timer 213 for measuring a predetermined interval. It is preferable that the predetermined interval is set, in advance, by the user.

When the predetermined interval has not elapsed (S203: NO), the normal data communication is executed in S209. When the predetermined interval has elapsed (S203: YES), control proceeds to S204, and transmission of the encrypted data is executed.

In S204, the CPU 202 controls the antenna switching unit 209 to turn OFF the omnidirectional antenna 212, and turn ON the directional antenna 211.

Then, the CPU 202 determines whether the data is received from the PC 221 in S205.

When the data has not been received from the PC 221 (S205: NO), control returns to S201. When the data has been received (S205: YES), the CPU 202 determines whether the received data is the encrypted data (S206).

When the data received from the PC 221 is the encrypted data (S206: YES), the ciphering data has been exchanged, and therefore control returns to S201.

When the data received from the PC 221 is not the encrypted data (S206: NO), it is necessary to exchange the ciphering data. In this case, the exchanging protocol of the ciphering data for the common key encrypting system is executed between the directional antenna 211 of the printer 201 and the omnidirectional antenna 233 of the PC 221 to exchange the ciphering data (S207).

The CPU 202 then registers the ciphering data, which was generated when the exchanging protocol is executed and was transmitted to the PC 221, with the ciphering data table (i.e., the deciphering data table 204a stored in the RAM 204) in relationship with the PC 221 (S208). Thereafter, control returns to S201. It should be noted that, in the PC 221, similarly to the above, the ciphering data received from the PC 221 is registered with the ciphering data table 225a in relationship with the printer 201.

Next, the normal data communication will be described with reference to FIG. 10.

Firstly, in this procedure, the CPU 202 determines whether data is received from the PC 221 (S20901). When no data is received (S20901: NO), the normal data communication procedure is finished. When the data has been received (S20901: YES), the CPU 202 determines whether the data transmitted from the omnidirectional antenna 233 of the PC 221 and received by the omnidirectional antenna 212 of the printer 201 is the encrypted data (S20902).

When the received data is not the encrypted data (S20902: NO), the normal data communication procedure is finished. When the received data is the encrypted data (S20902: YES), the CPU 202 further determines whether the ciphering data is stored in the deciphering data table 204a in relationship with the PC 221 and the encrypted data can be decoded using the stored ciphering data (S20903).

When the CPU 202 determines that the encrypted data cannot be decoded (S20903: NO), the normal data communication procedure is finished. When the CPU 202 determines that the encrypted data can be decoded (S20903: YES), the CPU 202 executes the deciphering program 203a to decode the encrypted data using the ciphering data, which is stored in the deciphering data table 204a in relationship with the PC 221, and prints out the decoded data with the printing unit 205 (S20904). Then, the normal data communication procedure is finished.

It should be noted that, in the PC 221, the encrypted data is encrypted by the ciphering program 225a using the ciphering data which is exchanged and registered with the ciphering data table 225a in S207.

It should be noted that the communication between the omnidirectional antenna 233 and the directional antenna 211, and the communication between the omnidirectional antenna 233 and the omnidirectional antenna 212 are executed using the same communication protocol. When the same communication protocol is used, only communication paths are different, and the wireless signal processing operations are identical. Therefore, the processing of the wireless signals becomes identical, which is convenient.

As above, with the communication system according to the second embodiment, the ciphering data to be referred to for deciphering, which is stored in the deciphering data table 204a of the printer 201 is transmitted through the directional antenna 211 (S204–S207).

As a result, the PC 221 which can receive the ciphering data is limited, and a possibility of the tapping of the ciphering data is lowered, and accordingly, the secrecy of the secret data can be improved.

Further, according to the second embodiment, the encrypted data using the ciphering data is transmitted from the PC 221 using the omnidirectional antenna 212 (S201 and S209). As a result, the printer 201 can receive the encrypted data transmitted from the PC 221 along various directions, which is convenient.

As described above, a directional mode transmission of the wireless signal can be realized using a generally used directional antenna 212 (e.g., the Yagi antenna), and the omnidirectional mode transmission of the wireless signal is realized using the generally used omnidirectional antenna 211 (e.g., the diversity antenna).

According to the communication system described above, only by configuring the printer 201 to perform the directional mode transmission of the wireless signal and the omnidirectional mode transmission of the wireless signal, the secrecy is improved. No extra structures of improving the secrecy need not be provided to the PC 221 or the printer 201 are required. Thus, the secrecy of the entire system can be improved relatively simply.

It should be noted that the present invention needs not be limited to the configurations of the above-described exemplary embodiments, and various modification can be made without departing from the scope of the invention.

In the above-described first embodiment, in order to achieve the directional mode transmission of the signal and the omnidirectional mode transmission of the signal, the PC 121 is provided with the directional antenna 131 and the omnidirectional antenna 132, and the antenna switching unit 129 is controlled to selectively use them. The invention needs not be limited to such a configuration. For example, the PC 121 may be provided with a single antenna that can be deformed to function as either the directional antenna or the omnidirectional antenna. Similarly, in the second embodiment, the printer 201 may be provided with a single antenna which can function as either the directional antenna 211 or the omnidirectional antenna 212.

In the first and second embodiments described above, the common key encrypting system using the same key as the ciphering and deciphering key is employed. The invention can be applied to the communication system employing the encrypting system using the ciphering and deciphering keys that are different from each other. In such a case, the deciphering key is transmitted through the directional antenna. Although the ciphering data (deciphering data) is transmitted in the above-described embodiments, information for identifying key data (i.e., deciphering data) used to decode the encrypted data may be transmitted instead of the key data itself.

In the above described embodiments, an electromagnetic wave is used for the wireless transmission. As a protocol of the wireless transmission, one according to a wireless LAN (e.g., IEEE 802.11a, IEEE 802.11b and IEEE 802.11g) or one according to the Bluetooth® technology can be employed. When the protocols according to IEEE 802.11a, IEEE 802.11b, and IEEE 802.11g are employed, transmission distance ranges will be 20–90 m, 50–180 m, and 20–180 m, respectively. When the Bluetooth® technology is used, the transmission distance range is 10–100 m. Therefore, it becomes unnecessary to arrange the terminal device and the electronic device close to each other.

The present disclosure relates to the subject matter contained in Japanese Patent Application No. 2002-33104, filed on Nov. 18, 2002, which is expressly incorporated herein by reference in its entirety.

What is claimed is:

1. A wireless communication system including a terminal device that transmits a wireless signal and an electronic device that receives the wireless signal transmitted by said terminal device, said terminal device comprising:
an encrypting system that encrypts data to be transmitted;
a first communication system that transmits a decrypting key to said electronic device with a wireless signal having a directivity; and
a second communication system that transmits the encrypted data to said electronic device with a wireless signal which does not have the directivity, the second communication system being configured to share all constituent elements other than an antenna with the first communication system,
said electronic device comprising:
a third communication system that receives the wireless signal transmitted by said transmitting system of said terminal device; and
a decoding system that decodes the encrypted data that is received through said third communication system using the decrypting key that is received through said third communication system.

2. The wireless communication system according to claim 1,
wherein said first communication system is provided with a directional antenna, and
wherein said second communication system is provided with an omnidirectional antenna.

3. The wireless communication system according to claim 1, wherein an encrypting key is identical to the decrypting key.

4. The wireless communication system according to claim 1, wherein said third communication system does not have the directivity.

5. The wireless communication system according to claim 1, which employs a protocol according to a wireless LAN.

6. The wireless communication system according to claim 1, which employs a protocol according to a Bluetooth® technology.

7. The wireless communication system according to claim 1, which employs a common key encrypting method.

8. A wireless communication system including a terminal device that transmits a wireless signal and an electronic device that receives the wireless signal transmitted by said terminal device,
said terminal device comprising:
an encrypting system that encrypts data to be transmitted;
a first communication system that transmits a decrypting key to said electronic device with a wireless signal having a directivity; and
a second communication system that transmits the encrypted data to said electronic device with a wireless signal which does not have the directivity,
said electronic device comprising:
a third communication system that receives the wireless signal transmitted by said transmitting system of said terminal device; and
a decoding system that decodes the encrypted data that is received through said third communication system using the decrypting key that is received through said third communication system,
wherein a communication between said first communication system and said third communication system and a communication between said second communication system and said third communication system are performed in accordance with the same communication protocol.

9. The wireless communication system according to claim 8, wherein the same communication protocol is a protocol according to a wireless LAN.

10. The wireless communication system according to claim 8, wherein the same communication protocol is a protocol according to a Bluetooth® technology.

11. A wireless communication system including a terminal device that transmits a wireless signal and an electronic device that receives the wireless signal transmitted by said terminal device,
said electronic device comprising:
a first communication system that transmits an encrypting key to be used for encrypting data to said terminal device with a wireless signal having a directivity;
a second communication system that receives encrypted data to be processed, said second communication system does not have directivity, the second communication system being configured to share all constituent elements other than an antenna with the first communication system; and
a decoding system that decodes the encrypted data received through said second communication system using a decrypting key corresponding to the encrypting key transmitted by said first communication system, and
said terminal device comprising:
a third communication system that is capable of receiving the encrypting key transmitted by said first communication system and transmitting data to said second communication system; and
an encrypting system that encrypts data to be processed using the encrypting key received through said third communication system, the encrypted data being transmitted to said second communication system through said third communication system.

12. The wireless communication system according to claim 11,
wherein said first communication system is provided with a directional antenna, and
wherein said second communication system is provided with an omnidirectional antenna.

13. The wireless communication system according to claim 11, wherein the encrypting key is identical to the decrypting key.

14. The wireless communication system according to claim 11, wherein said third communication system does not have the directivity.

15. The wireless communication system according to claim 11, which employs a protocol according to a wireless LAN.

16. The wireless communication system according to claim 11, which employs a protocol according to a Bluetooth® technology.

17. The wireless communication system according to claim 11, which employs a common key encrypting method.

18. A wireless communication system including a terminal device that transmits a wireless signal and an electronic device that receives the wireless signal transmitted by said terminal device,
said electronic device comprising:
a first communication system that transmits an encrypting key to be used for encrypting data to said terminal device with a wireless signal having a directivity;

a second communication system that receives encrypted data to be processed, said second communication system does not have directivity; and a decoding system that decodes the encrypted data received through said second communication system using a decrypting key corresponding to the encrypting key transmitted by said first communication system, and said terminal device comprising:

a third communication system that is capable of receiving the encrypting key transmitted by said first communication system and transmitting data to said second communication system; and an encrypting system that encrypts data to be processed using the encrypting key received through said third communication system, the encrypted data being transmitted to said second communication system through said third communication system, wherein a communication between said first communication system and said third communication system and a communication between said second communication system and said third communication system are performed in accordance with the same communication protocol.

19. The wireless communication system according to claim 18, wherein the same communication protocol is a protocol according to a wireless LAN.

20. The wireless communication system according to claim 18, wherein the same communication protocol is a protocol according to a Bluetooth® technology.

21. A terminal device for a wireless communication system including said terminal device and an electronic device, said terminal device comprising:

an encrypting system that encrypts data to be transmitted to said electronic device;

a first communication system that transmits a decrypting key to the electronic device with a wireless signal having a directivity; and a second communication system that transmits the encrypted data to the electronic device with a wireless signal which does not have the directivity, the encrypted data being decodable using the decrypting key transmitted by said first communication system, the second communication system being configured to share all constituent elements other than an antenna with the first communication system.

22. The terminal device according to claim 21, wherein said first communication system is provided with a directional antenna, and wherein said second communication system is provided with an omnidirectional antenna.

23. The terminal device according to claim 21, wherein an encrypting key is identical to the decrypting key.

24. The terminal device according to claim 21, wherein each of the first communication system and the second communication system employs a protocol according to a wireless LAN.

25. The terminal device according to claim 21, wherein each of the first communication system and the second communication system employs a protocol according to a Bluetooth® technology.

26. An electronic device for a wireless communication system including a terminal device and said electronic device, said electronic device comprising:

a first communication system that transmits an encrypting key to be used for encrypting data to the terminal device with a wireless signal having a directivity;

a second communication system that receives data to be processed from the terminal device, said second communication system does not have directivity, the data transmitted from the terminal device being encrypted using the encrypting key transmitted by said first communication system, the second communication system being configured to share all constituent elements other than an antenna with the first communication system; and a decoding system that decodes the encrypted data received through said second communication system using a decrypting key corresponding to the encrypting key transmitted by said first communication system.

27. The electronic device according to claim 26, wherein said first communication system is provided with a directional antenna, and wherein said second communication system is provided with an omnidirectional antenna.

28. The electronic device according to claim 26, wherein the encrypting key is identical to the decrypting key.

29. The electronic device according to claim 26, wherein each of the first communication system and the second communication system employs a protocol according to a wireless LAN.

30. The electronic device according to claim 26, wherein each of the first communication system and the second communication system employs a protocol according to a Bluetooth® technology.

31. A computer program product for controlling a terminal device for a wireless communication system including the terminal device and an electronic device, the computer program product controlling the terminal device to include functions of:

an encrypting system that encrypts data to be transmitted to the electronic device;

a first communication system that transmits a decrypting key to the electronic device with a wireless signal having a directivity; and a second communication system that transmits the encrypted data to the electronic device with a wireless signal which does not have the directivity, the encrypted data being decodable using the decrypting key transmitted by the first communication system, the second communication system being configured to share all constituent elements other than an antenna with the first communication system.

32. A computer program product for controlling an electronic device for a wireless communication system including a terminal device and the electronic device, the computer program product controlling the electronic device to include functions of:

a first communication system that transmits an encrypting key to be used for encrypting data to the terminal device with a wireless signal having a directivity;

a second communication system that receives data to be processed from the terminal device, the second communication system does not have directivity, the data transmitted from the terminal device being encrypted using the encrypting key transmitted by the first communication system, the second communication system being configured to share all constituent elements other than an antenna with the first communication system; and a decoding system that decodes the encrypted data received through the second communication system using a decrypting key corresponding to the encrypting key transmitted by the first communication system.

* * * * *